United States Patent [19]

Lotan et al.

[11] 3,736,567

[45] May 29, 1973

[54] PROGRAM SEQUENCE CONTROL

[75] Inventors: Amram Lotan, Holon, Israel; Dixson Teh-Chao Jen, Monroe, Conn.

[73] Assignee: Bunker Ramo Corporation, Oak Brook, Ill.

[22] Filed: Sept. 8, 1971

[21] Appl. No.: 178,695

[52] U.S. Cl. ..........340/172.5

[51] Int. Cl. ..........G06f 9/00

[58] Field of Search ..........340/172.5

[56] References Cited

UNITED STATES PATENTS 3,646,522 2/1972 Furman et al. ..........340/172.5

*Primary Examiner*—Raulfe B. Zache
*Attorney*—Frederick M. Arbuckle

[57] ABSTRACT

Program sequence control is described in connection with a computer having a main system program and one or more micro-order programs. The instructions in the system program are of two types: one type actually comprises a micro-order, and the other type designates an address where a sequence of micro-orders begins in a micro-order program. The sequence controller is able to load single micro-order instructions directly into its micro-order register for execution, or alternatively it addresses the micro-program to fetch a sequence of micro-orders which correspond to a multiple micro-order instruction. A special type of multiple micro-order instruction requires repetition of a particular micro-order any number of times up to a predetermined maximum. The system employs a single marked bit to distinguish single and multiple micro-order instructions, and also to identify the last micro-order in any multiple micro-order instruction, including the last repetition of a repeat cycle. A buffer register is also provided which permits more rapid access to the main system program through a "look ahead" feature, and provision is made for discarding the content of the buffer register when the "look ahead" assumption is invalidated by subsequent program contingencies. Provision is made for delaying the micro-program memory cycle when necessary to allow the system program memory to catch up.

24 Claims, 2 Drawing Figures

PROGRAM SEQUENCE CONTROL

FIELD OF THE INVENTION

This invention relates to apparatus and methods for program sequence control, and is particularly applicable to a micro-programmed computer.

BACKGROUND AND PRIOR ART

In the last few years micro-programmed computers have come into wide use, but they also have encountered some problems. At the termination of a sequence of operations carried out exclusively under the control of the micro-program memory, it is necessary to slow down the processing in order to re-access the system program memory. In general, the system memory is slower than the micro-program memory. Thus, there is a problem of matching two different memory speeds.

A micro-programmed machine is especially efficient during a type of operation which permits a string of several consecutive micro-order fetches involving access only to the micro-program memory. But the chain of hardware for converting an instruction fetched from the system program into a series of micro-orders fetched in the proper order from the micro-program is not needed in the special case where the system program instruction requires only a single micro-order. It is wasteful of both processing time and micro-program space to involve the micro-program memory in single micro-order operation.

Finally, for certain applications, it is necessary to execute the same micro-order several times in succession. Under these circumstances also, the entire set of program sequence steps necessary for repeated access to either the system program or micro-program is unnecessary and wasteful of both storage space and processing time.

SUMMARY OF THE INVENTION

The present invention has both hardware and software aspects, and relates to the internal system organization and procedures for a program sequence controller employing a micro-program. It is applicable generally to micro-programmed equipment, without regard to specific applications.

Between the system program memory and the hardware for addressing the micro-program memory, the program sequence controller of this invention provides a buffer register which gives the controller a "look ahead" capability. After a sequence of micro-orders is fetched from the micro-program memory, it is not necessary then to begin addressing the system program memory. In the present controller, the process of accessing the system program memory is completed earlier, the result of such system memory fetch is stored in the "look ahead" buffer register, and is then immediately available from that register when needed.

Under certain program contingencies, the word previously loaded into the look ahead buffer register will no longer be valid when the next operating cycle starts, and in that event special provision is made for a no-operation cycle to occur while the buffer register is reloaded with a new and valid word fetched from the system program memory.

Under certain circumstances it will be necessary to access the system program memory while the micro-program memory stands temporarily idle, and in that case the controller of the present invention provides a way of matching their disparate speeds by disabling the system clock while the system program concludes the current operation.

Additional processing speed is achieved in the special case when a particular instruction fetched from the program memory requires the execution of only one micro-order. Then the word fetched from core is actually a micro-order, and is loaded directly into the micro-order register downstream from the micro-program memory, thus bypassing the micro-program memory entirely. On the other hand, whenever the instruction fetched from the system program memory requires a sequence of micro-order instructions, the system program word is actually the address of the first micro-order in a series to be fetched from the micro-program.

In certain cases the sequence of micro-orders designated by a system program instruction consists of a definite number of repetitions of the same micro-order. In that case, a technique is employed in which a stack of special repeat micro-orders is located at consecutive addresses in the micro-order memory, and the stack is addressed at a level which is a function of the number of repetitions required. Then the controller proceeds incrementally through the repeat address stack until the last repeat micro-order is reached, and each time it blocks reloading of the downstream micro-order register so that the original micro-order is retained and re-executed once for each micro-program fetch cycle required to reach the end of the repeat stack.

The last micro-program memory address in the repeat stack is recognized by marking a predetermined bit position, and when that bit is recognized the repeat cycle is terminated by permitting the micro-order register to be reloaded on the next cycle. In addition, the same bit is used for distinguishing between single micro-order instructions which bypass the micro-program memory and go directly into the micro-order register, and multiple micro-order instructions which are fetched from the micro-program memory for loading into the micro-order register in the conventional manner.

DETAILED DESCRIPTION OF THE PREFERRED EMBODIMENT

Figure 1:
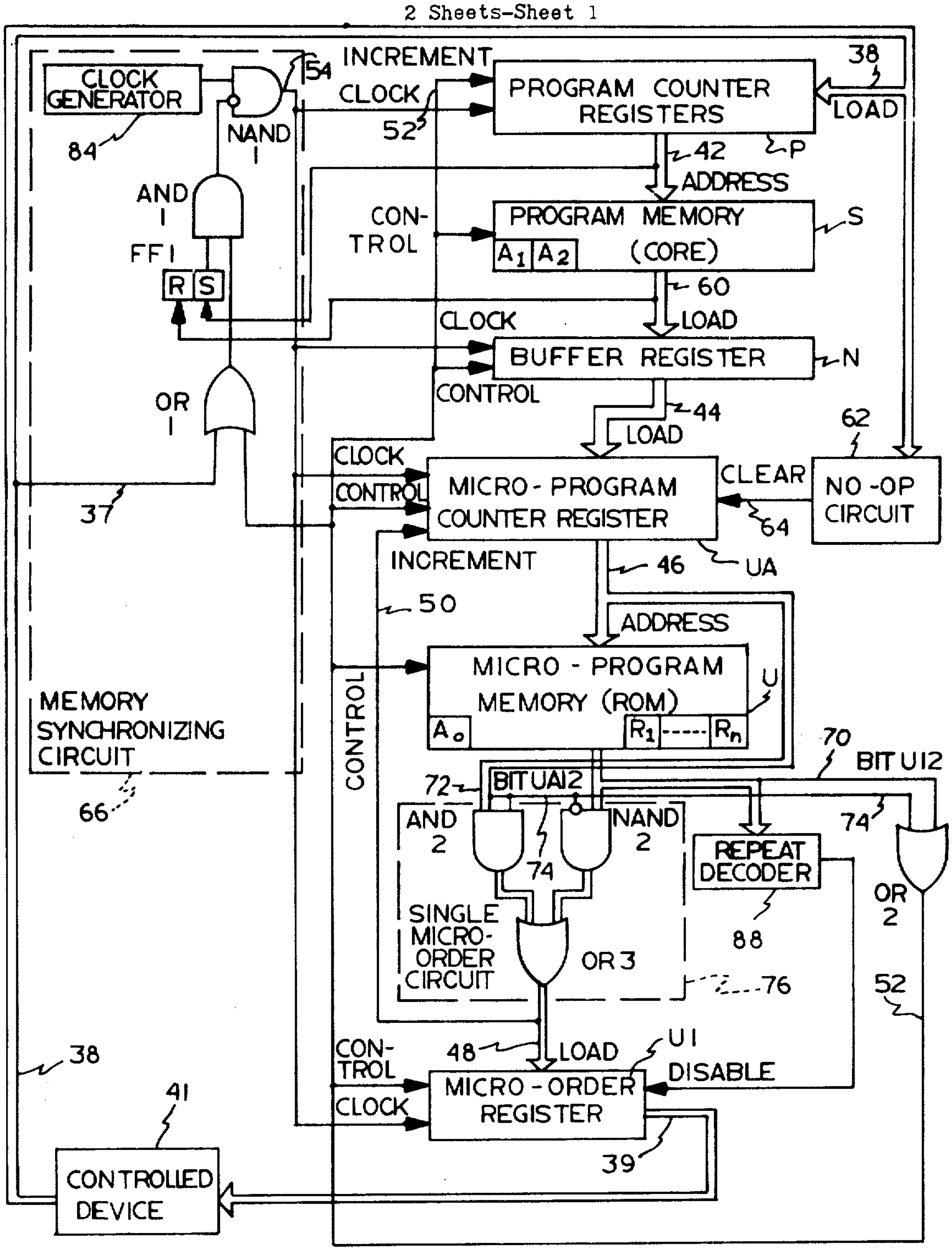
FIG. 1 is a block diagram of a program sequence controller in accordance with this invention.

The internal organization of the program sequence controller is indicated in the block diagram of FIG. 1. This controller may be briefly characterized as a small scale micro-programmed digital processor having, in common with prior art computers of that type, a system program read/write memory S and a read only micro-program memory U. In conventional fashion, program counter registers P are provided for maintaining a system program count, and for addressing the program memory S in accordance with that count. The micro-program memory U is addressed from a micro-program count maintained in a micro-program counter register UA.

In this controller, as in previous micro-program machines, an initial program count arrives from some device 41 controlled by the circuit of FIG. 1, and is loaded (via input lines 38) into the registers P. That count then issues over lines 42 to address the program memory S and fetch an appropriate micro-program count which is later loaded (via lines 44) into the micro-program counter register UA. The micro-program count then issues over lines 46 to address the micro-program memory U. The instruction fetched from the program memory S may require that a series of micro-orders be fetched from the micro-program memory U, and each one is loaded in turn (via lines 48) into a micro-order register UI downstream from the U memory. Then each micro-order loaded into the UI register issues over lines 39 for execution by the controlled device 41. After each fetch from the U memory the micro-program count in the UA register is incremented (via line 50). After a sequence of micro-orders corresponding to one S memory program instruction is fetched from the U memory, the program count in the P registers is incremented (via line 52) or changed by the next program count load arriving over lines 38 from the controlled device 41, and in either case the entire procedure is then repeated. The operations just described can only be carried out at time intervals coinciding with clock pulses on line 54.

In addition, operation of circuits S, UA, U and UI is gated by common control line 52. As a result, each unloading of the S memory normally coincides with loading of the UA register, addressing of the U memory, and loading of the UI register. As so far described, the operation of the program sequence controller is entirely conventional, and the circuits referred to all may be constructed from commercially available integrated devices and memory arrays. In a preferred embodiment, the circuits UA, U and UI were each made of standard integrated circuits having the following inputs which override one another according to the priorities stated: Disable (highest priority), Clear (second priority), Load (third priority), and Increment Count (lowest priority). In addition, these circuits have Control and Clock inputs which gate the Clear, Load, and Increment Count functions.

In accordance with this invention, a special look ahead buffer register N (having the same operating characteristics as circuits UA, U and UI) is connected between the program memory S and the micro-program counter register UA. The N register is also gated by the control signal on line 52 and clock line 54. Thus, each word fetched from the S memory, instead of being loaded directly into the UA counter in the conventional manner, is first loaded via line 60 into the N register. Then the contents of the N register are transferred over line 44 to the micro-program counter UA, and the next instruction word is fetched from the S memory and loaded into the buffer register N. Subsequently, the contents of the micro-program counter register UA are used (with appropriate incrementing) to address the U memory a number of times and thereby fetch a sequence of micro-orders corresponding to the instruction fetched from the S memory. But note that when the sequence of micro-orders has been fetched from the U memory, and the next S memory instruction word is required, that instruction word will be immediately available from the look ahead buffer register N, which can be accessed much more quickly than the S memory.

Generally speaking, in micro-program computers the program memory is a magnetic core device having read and write capabilities, while the micro-program memory is ordinarily a read-only device of the semiconductor type. The access time of semiconductor ROM's is considerably shorter than the access time for core memories, and in a particular embodiment of the invention the actual access time ratio was roughly of the order of 2:1.

Since the S memory is only about half as fast as the U memory, without the N register it would be necessary to wait at least one full cycle of the U memory while the next instruction is fetched from the S memory. In the present invention, however, the next S memory instruction can be read directly out of the N register in time to be used on the very next cycle of the U memory, and valuable processing time is not wasted. In addition, after the S memory instruction is transferred from the N register, its processing requires a time interval, usually the time required to process a sequence of two or more micro-orders designated by the S memory instruction. During that processing time the look ahead register N is reloaded "off line" at a relatively slow pace by fetching the next instruction from the S memory in anticipation of the end of the current U memory operating sequence. Then when the next S memory instruction is required it will be immediately available from the N register.

Under certain conditions of the controlled device, however, it will happen that by the time the U memory operating cycle is completed, a program test operation will have determined that a change is required in the next instruction to be fetched from the S memory. Those circumstances, which depend upon the particular application, the particular program, and the characteristics of the controlled device 41, are detected by a special no-op circuit 62. That circuit samples the data output of device 41 on lines 38, and when a no-op condition is detected, it applies a signal over a line 64 to clear the UA counter register to zero. A no-op condition on line 38 involves the appearance thereon of one of a class of codes indicating such system conditions as a U.A. transfer, the loading of a program counter, or the ending of a micro-program. No-op circuit 62 is a standard code detector circuit, such as a diode matrix or a bank of AND gates, which generates an output on line 64 when a code of the class is detected. The signal on line 64 overrides the signal on line 44, with the result that the now invalidated S memory instruction which has been waiting in the N register is not loaded into the UA register on this occasion, and the contents of the UA register are instead set to zero. As a result, when the latest contents of the UA register are used to address the U memory, the particular address selected will be the zero address ($A_0$) of the U memory. Consequently, the contents of memory address $A_0$ are next loaded into the UI register and presented to unit 41 for execution. The content of U memory address $A_0$ is whatever digital word is interpreted by the controlled device 41 as a no-operation micro-order. As a result, the program sequence controller will step the controlled device 41 through a no-operation cycle, while the invalid S memory instruction is cleared innocuously from the look ahead register N and a new, valid S memory instruction is loaded into the N register. Then on the following operating cycle, the new S memory instruction will propagate down the chain N, UA, U, and UI, and will ultimately be presented to the controlled device 41 for execution.

It is one of the advantages of this invention that the look ahead feature provided by the buffer register N makes it unnecessary in many cases for the fast U memory to stand idle while waiting for instructions from the slower S memory. Nevertheless there will be occasions when the next processing step requires an S memory instruction which is not immediately available. In the situation just discussed, for example, where the wrong S memory instruction is in the N register, then the no-op circuit 62 takes over and provides a single idle cycle of the U memory as described. But there will also be cases where the next required instruction is not yet available from the S memory for loading into the N register, as for example when the P registers are currently being loaded by lines 38 or are in the process of addressing the S memory. Any such situation is detected by a memory synchronizing circuit 66, which reacts by disabling clock line 54. As a result, the next S memory fetch, and the associated loadings of the buffer register N, micro-program counter register UA and micro-order register UI are unable to proceed, while waiting for the loading of program counter registers P or the current S memory fetch to conclude.

The memory synchronizing circuit 66 includes a clock generator 84 and a gate NAND 1 which control the clocking of program counter registers P, buffer register N, micro-program counter register UA and micro-order register UI by line 54. Gate NAND 1 is normally enabled, to permit clocking; but it is disabled, to prevent clocking, under conditions of unavailability of the core memory S. Those conditions are represented by the output of a gate AND 1 which requires two inputs. One of these is from an "S memory unavailable" flip-flop FF1 which is set, to enable gate AND 1, whenever there is an output on line 42 over which the P counter addresses the S memory. The flip flop FF1 is reset, to disable gate AND 1, whenever the addressing of the S memory is concluded as evidenced by a signal on the S memory output line 60. In other words, the main program memory S is considered unavailable from the time that it is addressed by the P counter to the time that it is ready to load the N register. During that time the flip flop FF1 is set to enable gate AND 1. During that time that gate AND 1 is so enabled, if there is also an output from gate OR 1 to gate AND 1, the latter disables gate NAND 1 to prevent clocking.

Gate OR 1 responds under either one of two alternative conditions, both of which require waiting until the S memory is available; i.e. either an input from lines 38 via line 37 indicating that there is a new external input to the P counters, or an input from line 52 indicating that the P counters are being incremented.

It will now be appreciated that this invention makes maximum use of processing time under all program conditions by addressing the S memory ahead of time whenever possible, and storing the results in the buffer register N for rapid availability when needed. When that degree of forethought is occasionally invalidated by the outcome of a program contingency, the no-op circuit 62 takes over to clear the hardware chain descending from the S memory, and re-insert a valid S memory instruction into the chain at the expense of only one wasted cycle of the U memory. When on occasion the buffer register N is ready but the S memory is unavailable, then the memory synchronizing circuit 66 takes over and idles the hardware until the P registers and the S memory are ready.

But in addition, valuable processing time is conserved by this program sequence controller in two special cases among the many types of S memory instructions which are to be processed by the downstream hardware. For example, in certain cases an S memory instruction requires that a particular micro-order be executed several times in succession. It would be wasteful of core space to have a separate address in the S memory devoted to each repetition of the same micro-order. Instead, the S memory, in accordance with this invention, contains one or more repeat instructions, each of which includes a variable data field for a value $r$ which designates the number of repetitions desired, and in any specific embodiment of the invention the variable $r$ can have any value from 1 through a selected maximum $n$. Then, in the micro-program memory U, there is provided a stack of $n$ separate repeat micro-orders at numerically consecutive addresses $R_1$ through $R_n$. In order to repeat an instruction stored at S memory address $A_1$, for example, that $A_1$ address instruction is first used in the normal way for loading the micro-order register UI. Then, after the P counters are incremented, a repeat instruction from the next consecutive S memory address $A_2$ is loaded into buffer register N. The $A_2$ instruction designates the number of repetitions required, by specifying the value of the variable quantity $r$ as some number in the range from 1 through $n$. Then this $A_2$ instruction is loaded from register N to micro-program counter UA and used to address the micro-program memory U where it designates a particular address $R_{(n-r)}$ within the repeat micro-order address stack $R_1$ through $R_n$. Thus, the variable quantity $r$ designates the particular level $(n-r)$ at which the repeat stack $R_1$ through $R_n$ is entered. A low value of $r$ (small number of repeats) addresses the repeat stack near the terminal end, i.e. closer to address $R_n$; while a larger value of $r$ (i.e. more repeats) addresses the repeat stack nearer the beginning, i.e. closer to address $R_1$.

Thereafter, the micro-order in the designated U memory address $R_{(n-r)}$ is decoded by a circuit 88 which then prevents reloading of the micro-order register UI. Therefore the previous content of the micro-order register, corresponding to the instruction in S memory address $A_1$, is retained and re-executed on the next micro-order execution cycle.

The output of the U memory, however, does pass through gates NAND 2 and OR 3, and energizes line 50 to increment the UA counter. As a result, on the next cycle the next address $R_{(n-r+1)}$ in the U memory repeat stack is addressed; and this process is repeated until finally the repeat stack address ascends to level $R_n$. Each time that one of the repeat stack micro-orders is decoded in circuit 88, the micro-order originally inserted by the S memory $A_1$ address instruction is retained in the micro-order register UI and re-executed another time. The number of repeat executions (after initial loading and execution of the micro-order in register UI) is $r$, the number of cycles required to increment the UA counter from an initial count of $R_{(n-r)}$ to a final count of $R_n$.

A repeat instruction is but one example of many S memory instructions which designate a sequence of micro-orders stored in numerically consecutive U memory addresses. A particular bit, e.g. the twelfth bit, is marked in the last micro-order of each multiple micro-order sequence, including repeat sequences. When the last micro-order in any such sequence is reached, the marked bit appears on a line 70, which then energizes gate OR 2 and line 52 to increment the program counters P and go on to the next appropriate address in the core memory S.

In the case of a repeat sequence, the micro-order stored at U memory address $R_n$ performs the function of incrementing the P counters. Subsequently the next U memory address selected will be outside the repeat stack $R_1$ through $R_n$. As a result the repeat decoder 88 will not be activated, and the micro-order register UI will then be reloaded in the normal manner.

For all multiple micro-order instructions in the S memory, including repeat instructions, the content of the instruction designates a particular address in the U memory, i.e. the address of the first micro-order in the required sequence. But there is another class of S memory instructions which each require only a single micro-order.

In accordance with this invention a considerable amount of U memory space is conserved by bypassing the U memory entirely when this situation arises. The content of a single micro-order instruction word stored in S memory comprises the micro-order itself, and does not designate a U memory address as in the case of multiple micro-order sequences. Special data lines 72 are provided which issue from the micro-program counter UA and entirely bypass the micro-program memory U. When an S memory instruction word issuing from the counter UA is recognized as a single micro-order instruction rather than a multiple micro-order instruction, a single micro-order circuit 76 loads the data from the micro-program counter UA directly into the micro-order register UI. At this time the micro-program counter output is not used in the usual manner to address the U memory and load the contents of the addressed location into the UI register.

The same bit position which is marked to indicate the last micro-order in a multiple micro-order sequence, e.g. the 12th bit, is also used to distinguish single micro-order instructions from multiple micro-order instructions. It will be recalled that when a marked 12th bit appears on line 70, this indicates that a micro-order sequence has been concluded and counter P must then be updated to initiate the next S memory fetch. A marked bit on line 74 indicates a single micro-order instruction, which also represents the completion of an S memory instruction, and therefore similarly requires updating of the P counter and a new S memory fetch. Accordingly, each single micro-order instruction in the S memory has the 12th bit marked, and when such an instruction issues from the UA counter, line 74 carries a marked bit UA12. A marked 12th bit on either line 70 (last micro-order in a sequence) or line 74 (single micro-order) traverses gate OR2 and this energizes line 52 to initiate the P counter incrementing operation. The no-op micro-order at U memory address $A_0$ may also be considered a form of single micro-order instruction, and therefore has bit U12 marked for activating gate OR 2 and the program count incrementing line 52. As a result of this dual use of the 12th bit, space is saved in both the S memory and the U memory, and an important degree of hardware simplicity is attained.

Since a marked bit UA12 on line 74 is the signal which identifies a single micro-order instruction, it is also used for activating the single micro-order circuit 76 to cause direct loading from the UA counter to the UI register. Thus, the single micro-order circuit 76 comprises control gates AND 2 and NAND 2. The outputs of both gates are buffered through gate OR 3 and then loaded into the micro-order register UI. Gate AND 2 admits each single micro-order instruction issuing from the UA counter over lines 72, while gate NAND 2 admits the micro-orders issuing from the U memory in each sequence corresponding to a multiple micro-order instruction. Under single micro-order instruction conditions, gate AND 2 is enabled and gate NAND 2 is blocked by the marked twelfth bit on line 74 which identifies a single micro-order instruction. Under multiple micro-order instruction conditions, on the other hand, line 74 provides no enabling input to gate AND 2 and no blocking input to gate NAND 2.

In summary, single micro-order instructions are handled entirely differently from multiple micro-order instructions. As stored in the S memory, the single micro-order instructions comprise actual micro-orders rather than U memory addresses; and upon being fetched from the S memory, these single micro-orders proceed directly to the micro-order register UI. The normal procedure of using the UA counter to address the U memory is not used.

If the no-op micro-order stored at address $A_0$ of the U memory is considered a single micro-order instruction, however, there is one exception to the rule that single micro-order instructions are stored in the S memory and go directly from the UA counter to the UI register. The no-op micro-order (as described above) is fetched from the U memory by the usual addressing technique when the UA counter is cleared to zero by no-op circuit 62.

Figure 2:
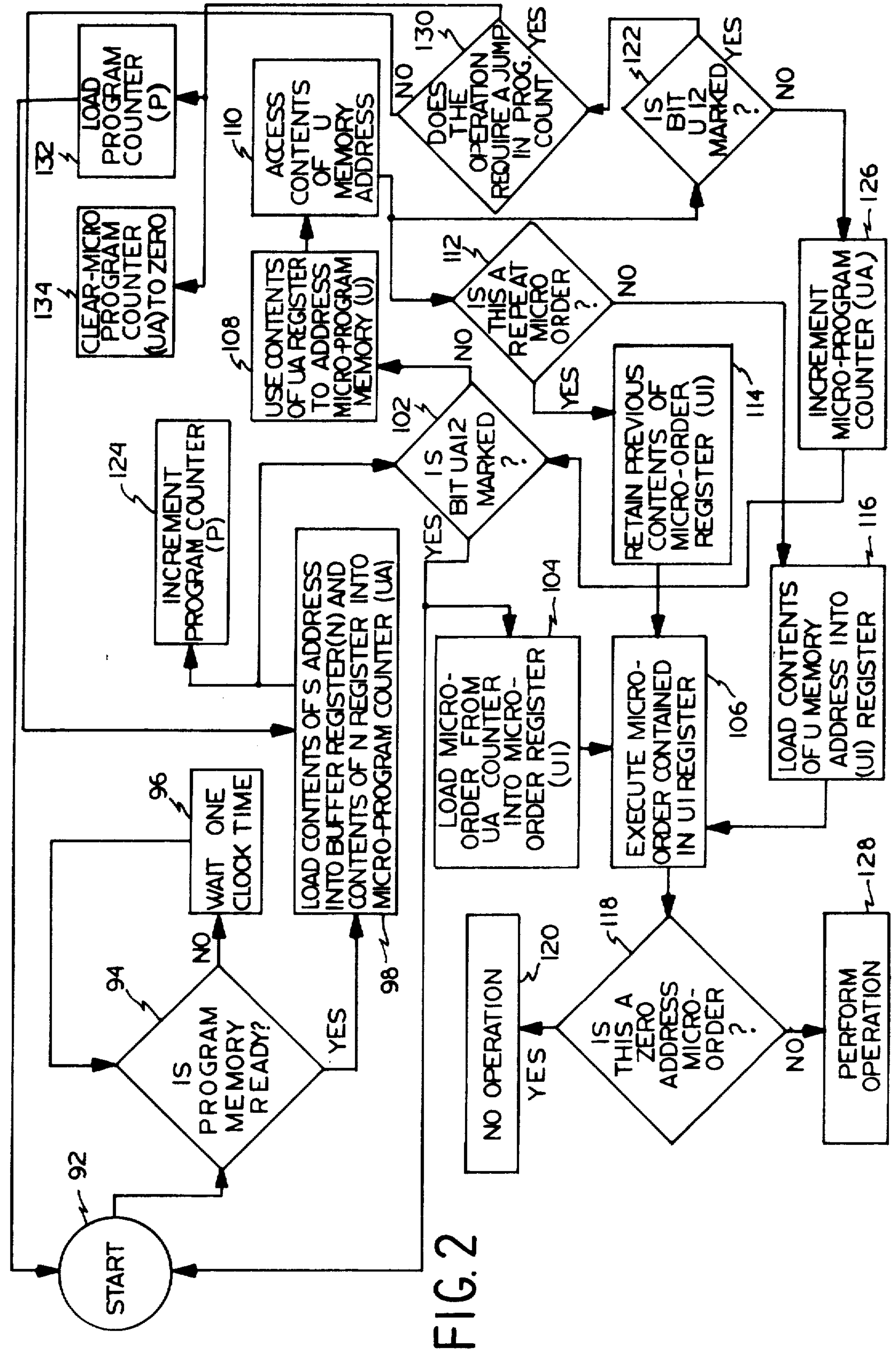
FIG. 2 is a program flow chart illustrating the operation of the program sequence controller.

The software aspects of this invention are best understood in connection with the program flow chart of FIG. 2. Beginning at a start point 92, the first operation 94 tests whether the S memory is ready. If the S memory is not ready, step 96 loops back and re-enters the test step 94. This can happen any number of times until the test step 94 obtains a positive answer. Then the content of the S memory address selected by the P counters is loaded into the buffer register N for look ahead storage, and the previous content of the N register is loaded into the micro-program counter UA, as indicated by step 98. Then the program branches to two steps 124 and 102. Step 124 increments the P counter so that a new S memory addressing operation can take place the next time start point 92 is entered.

Step 102 is a test performed to determine whether the twelfth bit of the output of micro-program counter UA is marked to indicate that it is a single micro-order instruction. If the outcome of that test is positive, then the content of register UA has been determined to be a micro-order rather than a U memory address. In that case, as indicated by step 104, the micro-order instruction is loaded from the UA register into the micro-order register UI. Then the program proceeds to step 106, in which the micro-order contained in register UI is executed. At the same time, step 102 loops back to start point 92 to re-enter the main program.

On the other hand, if the results of test step 102 are negative, then the content of counter UA is known to be a U memory address designating the first micro-order in a multiple micro-order sequence. In that case, as indicated by step 108, the content of the UA register is used to address the micro-program memory U, and the content of the selected U memory address is unloaded as indicated by step 110.

The unloaded content of the selected U memory address is then tested as indicated by step 112 to determine whether it is a repeat micro-order. If it is, the unloaded content of the U memory address is not placed in the UI register, and instead the previous micro-order in the UI register is retained as indicated by step 114. The previous micro-order is then re-executed as indicated by step 106 previously discussed. On the other hand, if the results of test 112 are negative, an alternative program step 116 is employed to load the content of the selected U memory address into the micro-order register UI, replacing the previous UI register content. Then the new content of the UI register is executed as indicated in step 106 previously discussed.

Whether step 106 is entered from steps 104, 114, or 116, the next step is a test 118 to determine whether the micro-order currently stored in the UI register for execution is the one fetched from the zero address of the U memory, which is a no-operation micro-order. If the test is positive, no operation is performed, as indicated by step 120. But if the outcome of the zero address test step 118 is negative, then the micro-order is not a no-op, and a operation which it indicates is performed as indicated by step 128.

Each time that the program exits from step 110 (unloading the contents of the selected U memory address), it performs a test 122 to determine if the twelfth bit in the output of the U memory is marked to indicate the end of a multiple micro-order sequence. If the outcome is positive, the program branches to test step 130 which determines whether the operation represented by step 128 (if any) requires a jump in the program count (registers P). If so, the program proceeds to step 132 which calls for loading the new program count into registers P, and then returns to start point 92, after which the S memory fetch cycle is repeated as previously described. In addition, a positive outcome of the program count jump test 130 leads to step 134, in which the micro-program counter UA is cleared to zero, insuring that a no-op cycle will take place as previously described in connection with step 120. If that happens, the contents of the micro-program memory counter UA are subsequently replaced with a non-zero count when the S memory cycle loop is repeated via steps 92, 94, and 98.

If the results of the program count jump test 130 are negative, on the other hand, then the program returns from step 130 to step 98 in order to process the next S memory instruction waiting in the look ahead buffer register N.

If the outcome of the U12 test 122 is negative, that indicates a requirement to continue with the succeeding steps of a multiple micro-order sequence, and the next event is to increment the micro-program counter UA as indicated by step 126. Then the program returns to the UA12 bit test 102 in order to repeat the micro-order register (UI) loading cycle described above.

It will now be appreciated that the program sequence control technique of this invention, both in its hardware and software aspects, saves processing time by consulting the system program memory in advance, and storing the results in a look ahead buffer register for immediate use when the next system program instruction is required. Nevertheless, the contents of the buffer register are discarded, whenever invalidated by program contingencies, during a single no-op cycle which is achieved by the simple expedient of clearing the micro-program counter to zero and "executing" the resulting zero address no-op instruction. On those occasions when it is necessary to wait for access to the system program memory, a memory matching technique is employed which idles the hardware temporarily. As a result, core storage is effectively matched with a faster semiconductor memory. Further processing time is saved by distinguishing between single micro-order and multiple micro-order instructions. The distinction is made on the basis of a particular marked bit, and enables single micro-order instructions to be stored in micro-order form in the program memory, and to bypass the micro-program memory for direct loading to the micro-order register. Multiple micro-order instructions, on the other hand, take the form of a micro-program memory address which initiates a sequence of micro-order fetch operations. Among the operations which are advantageously performed by the micro-program fetch sequence procedure is an economical repeat procedure which employs a stack of addresses in the micro-program memory to retain the previous contents of the micro-order register until the repeat requirement is exhausted. Advantageously, the same marked bit which distinguishes single micro-order instructions is used to identify the no-op micro-order, and the last micro-order in a repeat or any other multiple micro-order sequence.

Since the foregoing description and drawings are merely illustrative, the scope of protection of the invention has been more broadly stated in the following claims and these should be liberally interpreted so as to obtain the benefit of all equivalents to which the invention is fairly entitled.

The embodiments of the invention in which an exclusive property or privilege is claimed are defined as follows:

1. A program sequence controller comprising:

a program memory for simultaneously storing at least one instruction which comprises a single micro-order and at least one instruction which designates at least the first one of a series of micro-order addresses, a micro-program memory for storing micro-orders at said addresses, means for addressing said micro-program memory, means for loading the contents of said program memory into said micro-program addressing means, a micro-order register for storing a micro-order to be executed, means to determine if the output of said micro-program addressing means is a micro-order or an address, and means responsive to said determining means to load the output of said micro-program addressing means into said micro-order register when said output is a micro-order and to load the contents of the addressed location in said micro-program memory into said micro-order register when said output is an address.

2. The controller of claim 1 further comprising:

a program counter, and incrementing means for said program counter operating in response to at least one predetermined bit in a micro-order fetched from said micro-program memory and also in response to said same predetermined bit in an address issuing from said micro-program addressing means.

3. The controller of claim 2 wherein said determining means responds to said same predetermined bit in said output of said micro-program addressing means to load said output into said micro-order register.

4. A program sequence controller comprising:

a program memory, a buffer register loadable from said program memory, micro-program addressing means loadable from said buffer register, a micro-program memory addressable thereby, and means for loading said buffer register from said program memory when said micro-program addressing means is loaded from said buffer register.

5. The controller of claim 4, for use with controlled equipment, and further comprising:

means responsive to at least one predetermined condition of said controlled equipment to set said micro-program addressing means to a predetermined address, said micro-program memory storing at said predetermined address a micro-order which has no-operation significance to said controlled equipment.

6. The controller of claim 5 including means for indicating a requirement to replace said reloaded contents of said buffer register before the next loading of said micro-program addressing means wherein said predetermined condition is an output from said indicating means.

7. The controller of claim 5 further comprising a program counter for addressing said program memory and means for incrementing said program counter and operating in response to at least one predetermined bit in a micro-order fetched from said micro-program memory, said no-operation micro-order having said predetermined bit.

8. A program sequence controller comprising:

a program memory, micro-program addressing means, means for loading said addressing means from said program memory, a micro-program memory addressed by said micro-program addressing means, said micro-program memory being faster than said program memory, means having an output for clocking the loading of said micro-program addressing means, means for controlling the operation of said means having a clocking output, and means responsive to said program memory to detect when said program memory is unavailable and effective then to disable said clock output controlling means.

9. The controller of claim 8 further comprising a micro-order register loadable from said micro-program memory in response to said controlled clock output.

10. A program sequence controller comprising a program counter, a program memory addressable from said program counter, a micro-program counter, means for loading said micro-program counter from said program memory, a micro-program memory addressable from said micro-program counter, a micro-order register loadable from said micro-program memory, means for preventing the loading of said micro-order register, said micro-program memory having repeat micro-orders stored at each one of a stack of $n$ consecutive addresses having a terminal end, repeat micro-order decoding means responsive to the output of said micro-program memory and connected to activate said load preventing means in order to retain the contents of said micro-order register for an additional load cycle thereof each time one of said repeat micro-orders is decoded thereby, said program memory storing at least one repeat instruction which calls for $r$ repetitions of a preceding instruction, where $r$ is in the range 1 through $n$ inclusive and said repeat instruction designates an address in said micro-program memory which is $r$ steps from said terminal end of said repeat stack, means for stepping said micro-program counter after each micro-program memory fetch whereby to select addresses successively closer to said terminal end of said repeat stack, and means responsive to said micro-program memory for detecting the micro-order at said terminal end of said repeat stack and then incrementing said program counter.

11. The controller of claim 10 wherein said program memory also stores at least one additional instruction which designates a plurality of micro-orders, further comprising means for detecting at least one predetermined bit in a micro-order fetched from said micro-program memory, and wherein said program counter incrementing means operates in response to detection of said predetermined bit, the repeat micro-orders at addresses other than said terminal end do not have said predetermined bit and the repeat micro-order at said terminal end does.

12. The controller of claim 11 wherein said program memory simultaneously stores at least one instruction which comprises a single micro-order and at least one instruction which designates at least one micro-program address, and further comprising means for detecting said same predetermined bit in the output of said micro-program counter in order to determine if said output is a micro-order or an address, and means responsive to said counter output detecting means to load the output of said micro-program counter into said micro-order register when said counter output has said same predetermined bit and to load the contents of the addressed location in said micro-program memory into said micro-order register when said counter output does not have said predetermined bit.

13. A method of controlling a program sequence comprising the steps of: utilizing a program including at least one instruction which comprises at least one micro-order and at least one instruction which designates at least the first one of a series of micro-order addresses which contain micro-orders, determining if an instruction is a micro-order or an address, executing said instruction when it is a micro-order, and using said instruction for selecting at least said one micro-order address and executing the contents of said address when said instruction designates such address.

14. The method of claim 13 further comprising the steps of:

maintaining a program count, using said count to address said program, and incrementing said program count when there is a predetermined bit in a micro-order fetched either from said program or from one of said series of micro-order addresses.

15. The method of claim 14 wherein said step of determining if said instruction is a micro-order or an address is accomplished by sampling said same predetermined bit.

16. A method of controlling a program sequence comprising the steps of:

utilizing a program and a micro-program, addressing said program, holding the addressed contents of said program in buffer storage, and using the previous contents of said buffer storage for addressing said micro-program.

17. The method of claim 16 further comprising the steps of:

using said method to control equipment which recognizes a no-operation micro-order, recognizing at least one predetermined condition of said equipment, having a no-operation micro-order at a predetermined micro-program address, and fetching said no-operation micro-order from said predetermined address and using it to idle said controlled equipment when said predetermined condition is recognized.

18. The method of claim 17 including the steps of detecting a selected predetermined condition; and replacing the contents of said buffer storage before the next micro-program fetch in response to the detection of said predetermined condition.

19. The method of claim 17 wherein said no-operation micro-order has at least one predetermined bit, and further comprising the steps of maintaining a program count, using said program count to address said program, and incrementing said program count whenever a micro-order fetched from said micro-program has said predetermined bit.

20. The method of controlling a program sequence comprising the steps of:

utilizing a program, maintaining a micro-program count, taking said micro-program count from- said program at selected time intervals, utilizing a micro-program, addressing said micro-program from said micro-program count, detecting when said program is unavailable to change said micro-program count, and then skipping at least one of said micro-program count change intervals.

21. The method of claim 20 normally comprising the additional step of addressing said micro-program at said same time intervals, but in which said micro-program addressing step is skipped whenever said micro-program count change is skipped.

22. A method of controlling a program sequence comprising the steps of:

maintaining a program count, utilizing a program, addressing said program from said program count, maintaining a micro-program count, taking said micro-program count from said program, utilizing a micro-program, addressing said micro-program from said micro-program count, executing a micro-order fetched from said micro-program, storing repeat micro-orders in said micro-program at each one of a stack of *n* consecutive addresses having a terminal end, recognizing repeat micro-orders fetched from said micro-program, re-executing the previously executed micro-order each time a repeat micro-order is recognized, storing in said program at least one repeat instruction which calls for *r* repetitions of a preceding instruction where *r* is in the range 1 through *n* inclusive and said repeat instruction designates an address in said micro-program which is *r* steps from said terminal end of said repeat stack, stepping said micro-program count after each micro-program fetch whereby to select addresses successively closer to said terminal end of said repeat stack, recognizing the micro-order at said terminal end of said repeat stack, and incrementing said program count when said terminal end micro-order is fetched.

23. The method of claim 22 wherein said program also contains at least one additional instruction which designates a plurality of micro-orders, including the step of incrementing said micro-program count when there is at least one predetermined bit in a micro-order fetched from said micro-program, the repeat micro-orders at addresses other than said terminal end not having said predetermined bit, and the repeat micro-order at said terminal end having said predetermined bit.

24. The method of claim 23 wherein said program simultaneously contains at least one instruction which comprises a single micro-order and at least one instruction which designates at least one micro-program address, and further comprising the steps of:

sampling said same predetermined bit in said micro-program count in order to determine if said output is a micro-order or an address, executing said micro-program count when said count has said same predetermined bit, and executing the contents of the micro-program address designated by said micro-program count when said count does not have said predetermined bit.

* * * * *